United States Patent
Namba et al.

(10) Patent No.: US 6,884,163 B2
(45) Date of Patent: Apr. 26, 2005

(54) GAME METHOD FOR EFFECTING AGING OF COMPETING CHARACTERS INDEPENDENT OF GAME PLAYER PARTICIPATION

(75) Inventors: Kazuhiro Namba, Amagasaki (JP); Norio Nakayama, Osaka (JP)

(73) Assignee: Konami Computer Entertainment Studios, Inc., Tokyo (JP)

( * ) Notice: Subject to any disclaimer, the term of this patent is extended or adjusted under 35 U.S.C. 154(b) by 169 days.

(21) Appl. No.: 09/919,308

(22) Filed: Jul. 31, 2001

(65) Prior Publication Data

US 2002/0016195 A1 Feb. 7, 2002

(30) Foreign Application Priority Data

Aug. 1, 2000 (JP) ........................................ 2000-233670

(51) Int. Cl.[7] .............................................. A63F 13/00
(52) U.S. Cl. ............................................. 463/1; 463/43
(58) Field of Search ........................... 463/1, 3, 23, 29, 463/40–43; 345/121, 139; 273/317.1, 461; 709/203, 218

(56) References Cited

U.S. PATENT DOCUMENTS

| | | | | |
|---|---|---|---|---|
| 4,738,451 A | * | 4/1988 | Logg | 463/2 |
| 5,796,393 A | * | 8/1998 | MacNaughton et al. | 709/218 |
| 5,816,920 A | * | 10/1998 | Hanai | 463/42 |
| 5,846,132 A | * | 12/1998 | Junkin | 463/42 |
| 5,860,862 A | | 1/1999 | Junkin | |
| 5,890,963 A | * | 4/1999 | Yen | 463/42 |
| 5,964,660 A | * | 10/1999 | James et al. | 463/1 |
| 5,971,855 A | | 10/1999 | Ng | |
| 6,352,479 B1 | * | 3/2002 | Sparks, II | 463/42 |

FOREIGN PATENT DOCUMENTS

| | | |
|---|---|---|
| EP | 0962900 | 12/1999 |
| EP | 1010447 | 6/2000 |
| GB | 2332863 | 7/1999 |
| JP | 10-328416 | 12/1998 |
| JP | 2000-112886 | 4/2000 |
| JP | 11-192384 | 11/2000 |
| JP | 2001-129258 | 5/2001 |
| KR | 2000-0036826 | 7/2000 |
| TW | 440771 | 5/1999 |
| WO | WO 99/38590 | 8/1999 |

OTHER PUBLICATIONS

Quake II Users Manual © 1997 Id Software Inc, pp. 1–35.*

* cited by examiner

*Primary Examiner*—Derris H. Banks
*Assistant Examiner*—Robert Mosser
(74) *Attorney, Agent, or Firm*—Jordan and Hamburg LLP

(57) ABSTRACT

Using terminal apparatuses 1A to 1E connected to a server 3 by a network 2, original characters are trained by the game players executing a character training game, and data relating to those original characters are stored in a database 31 in the server 3. When two or more game players directly contest the same game in real time via the network 2, data relating to the original characters of the game players stored in the database 31 are downloaded to the terminal apparatuses 1A to 1E and used as character data.

19 Claims, 15 Drawing Sheets

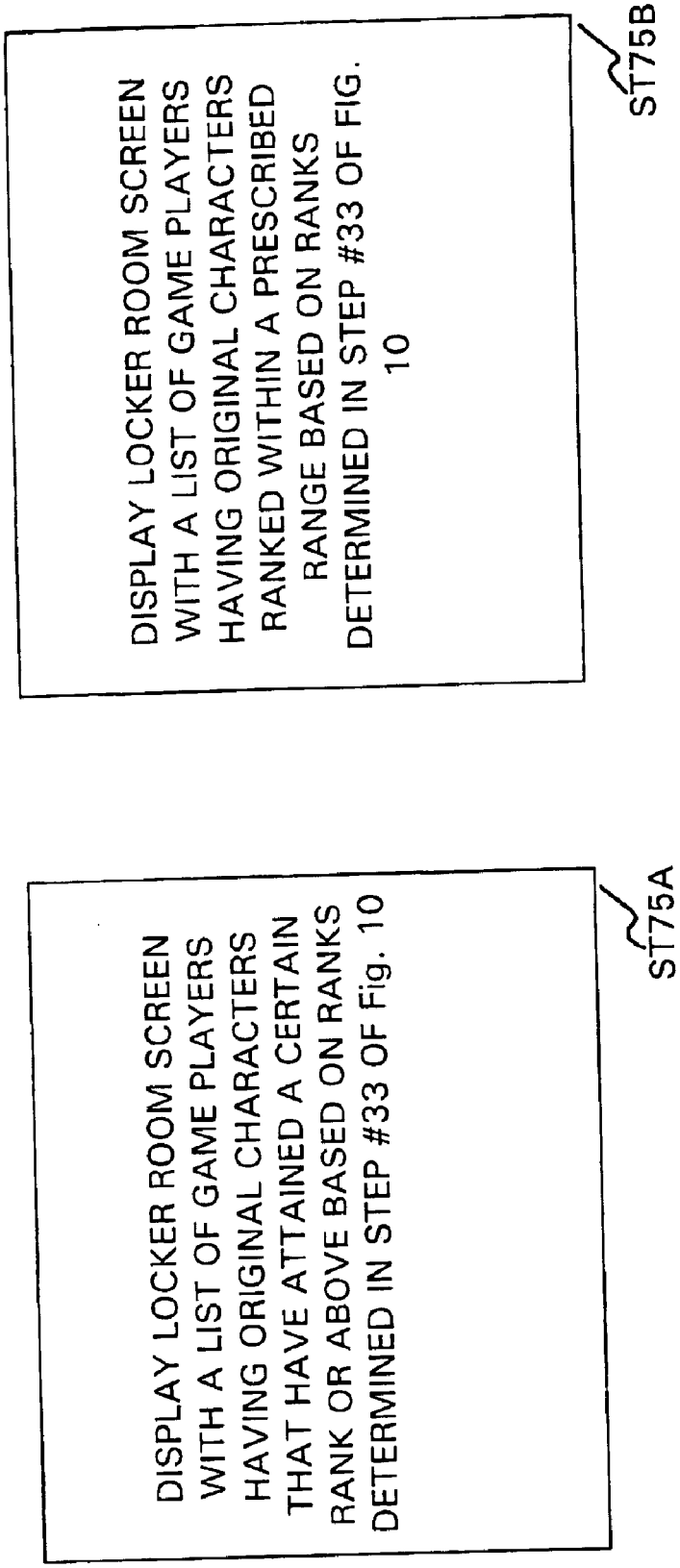

GAME METHOD FOR EFFECTING AGING OF COMPETING CHARACTERS INDEPENDENT OF GAME PLAYER PARTICIPATION

BACKGROUND OF THE INVENTION

1. Field of the Invention

This invention relates to a game procedure control method and game system wherewith direct game competition is possible between a plurality of game players using a plurality of terminal apparatuses connected to a server via a network.

2. Description of the Related Art

With a game like a baseball game, for example, where an opponent is competed with, it is possible to conduct direct competition by a plurality of game players, connecting a plurality of controllers to a single game apparatus. Also, game players in remote locations are competing directly with each other, respectively, in baseball games and the like using terminal apparatuses such as personal computers connected via a network.

In a baseball game that has been provided for some time by the applicant, however, a player character training mode is included wherewith original characters selected discretionally by a game player can be conditioned by training and made to participate in the game as professional baseball players.

With direct competition in a conventional game through a network, however, nothing further is accomplished than taking the direct competition of a game played by connecting a plurality of controllers to a single game apparatus such as is commonly played in homes and extending it to competition between game players at remote locations via a network. The game software is merely loaded into the game apparatuses or terminal apparatuses possessed by the game players, and nothing more is done than to have only the operation signals input by the game players transmitted and received via the network.

Data relating to the original character trained by each game player, or to teams made up of such original characters, are stored only in the game apparatuses or terminal apparatuses of those particular game players. It has not been possible to have original characters compete against each other, or teams made up of original characters compete against each other, via a network.

SUMMARY OF THE INVENTION

An object of the present invention, which was devised in order to resolve the problems with the conventional examples noted above, is to provide a game procedure control method and game system wherewith it is possible to effect direct competition between original characters or between teams made up of such original characters, in a stadium on a server connected through a network, which original characters have been trained by the game players by the execution of a player character training mode in the game apparatuses possessed by them.

The game procedure control method according to an aspect of the present invention is a game procedure control method wherewith at least two game players can engage in competition, using at least two terminal apparatuses connected to a server through a network, and comprises the steps of: storing data relating to an original character trained independently by each game player in a prescribed memory area in the server; reading out the data relating to the original character of each game player stored in the memory area as character data to be used when a game program is executed; transmitting control data input by each game player for causing his or her own original character to move on the monitor screen of each terminal apparatus to the terminal apparatus of a game player that is a competing opponent via the server; and causing the original character of the opponent to move, in correspondence with the control data, on the monitor screen of the terminal apparatus, using the control data transmitted back from the server.

According to this composition, it becomes possible to cause original characters trained by game players to compete directly against each other via a network.

The game system according to another aspect of the present invention comprises: a server wherein are stored data relating to original characters trained independently by game players, being character data used for a game program wherewith competition is possible between at least two game players; and a plurality of terminal apparatuses, each of which is capable of being connected to the server through a network, comprises a control unit manipulated by the game player, and is capable both of storing data relating to the original character in the server and of reading out data relating to the original character when the game program is executed.

According to this composition, two or more game players who do not know each other can directly compete in a game via a network. It is also possible to hold tournaments participated in by many game players.

The server according to still another aspect of the present invention is one wherein: access is possible from terminal apparatuses operated by game players through a network; and data relating to original characters trained independently by the game players, which are character data to be used for a game program wherewith competition is possible between at least two game players, are stored.

According to this composition, it becomes possible for game players to access the server from a terminal apparatus of a different type from their own personal computer or game apparatus, and engage in direct game competition.

These and other objects, features and advantages of the present invention will become more apparent upon a reading of the following detailed description and accompanying drawings.

BRIEF DESCRIPTION OF THE DRAWINGS

FIG. 15 shows alternative embodiments of step 75 of FIG. 13.

DESCRIPTION OF THE PREFERRED EMBODIMENTS

Figure 1:
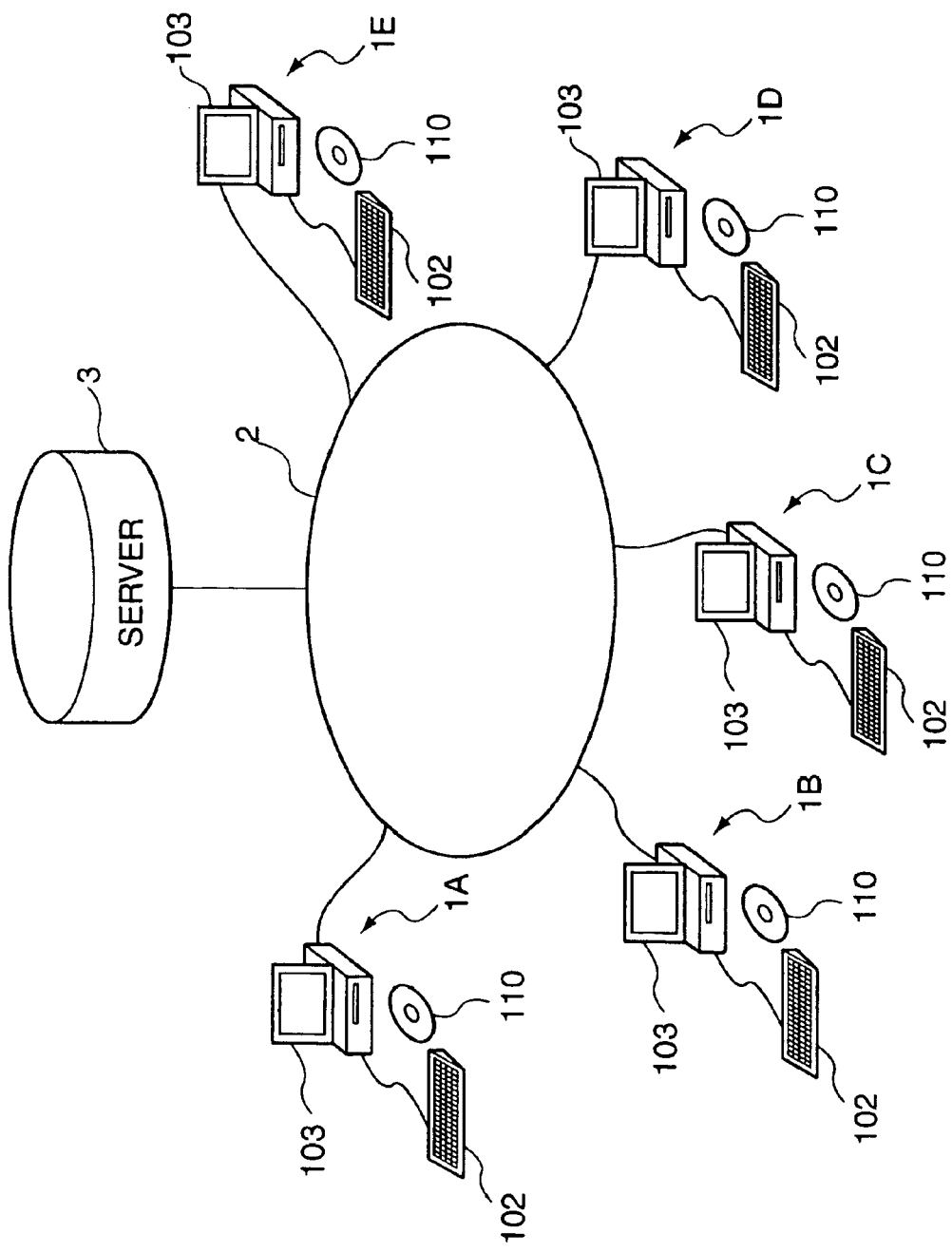
FIG. 1 is a diagram showing how, in one embodiment of the present invention, a plurality of game player terminal apparatuses is connected to a server through a network.
Figure 2:
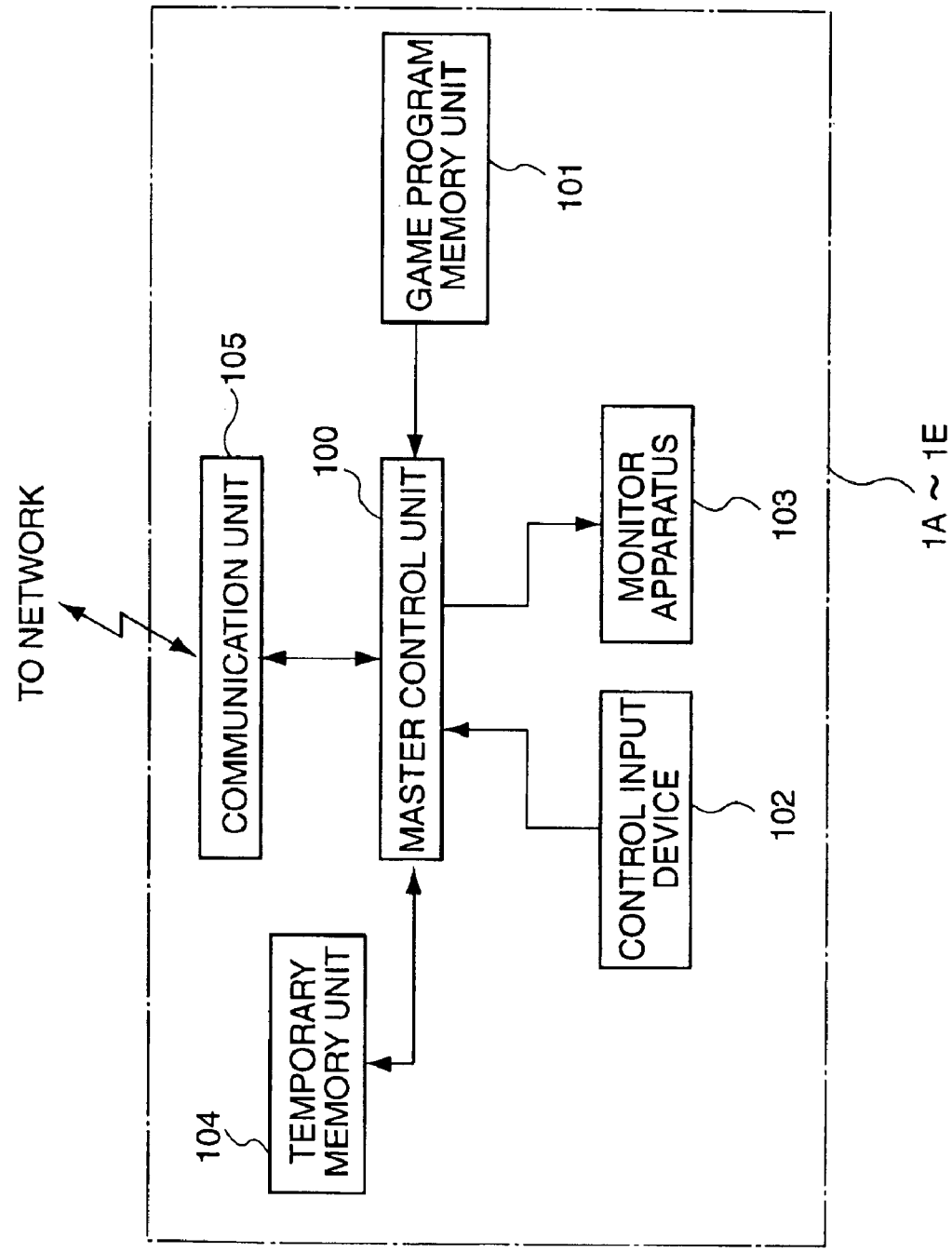
FIG. 2 is a block diagram representing the configuration of a terminal apparatus in the embodiment noted above.
Figure 3:
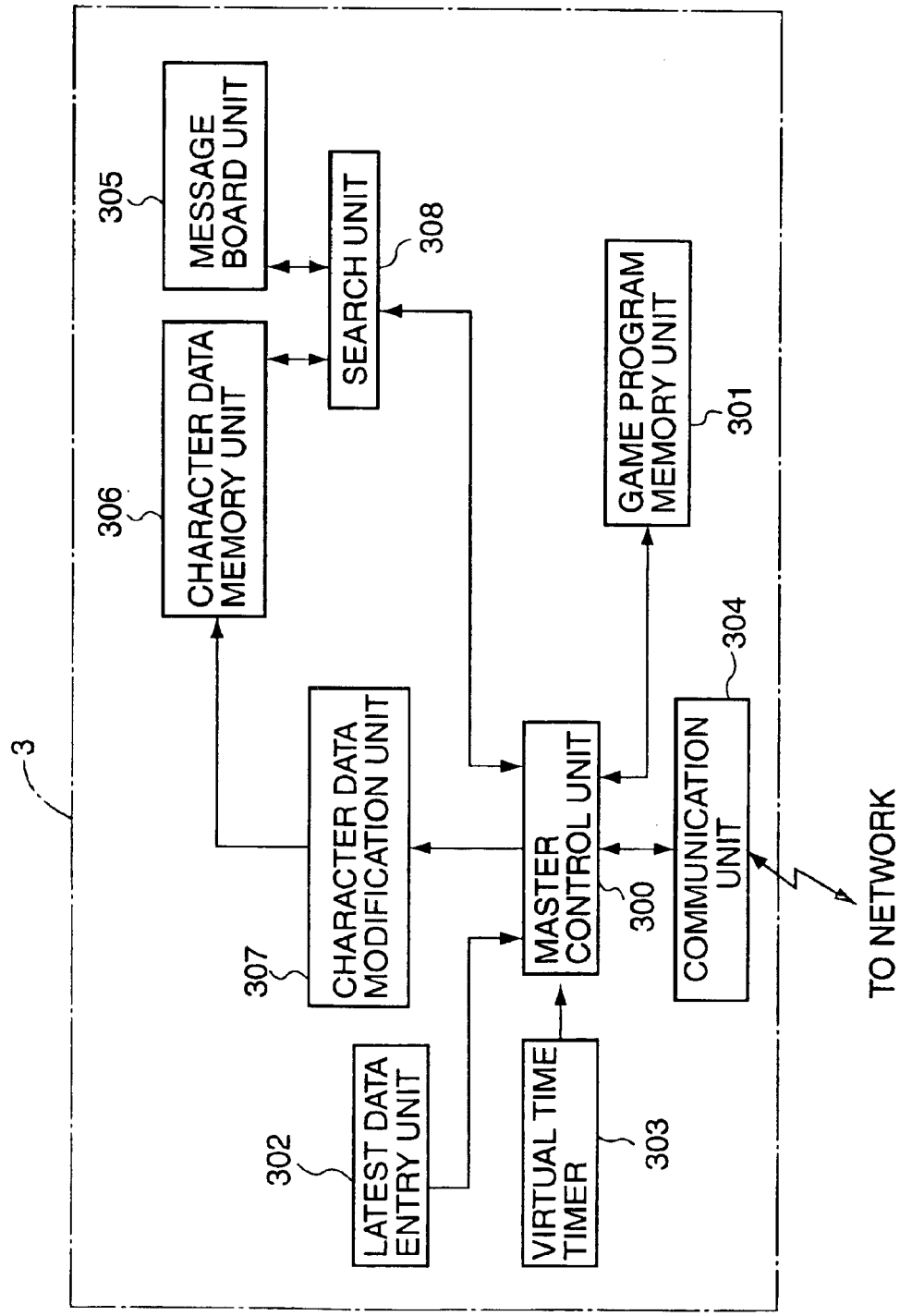
FIG. 3 is a block diagram representing the configuration of a server in the embodiment noted above.

A baseball game is described as one embodiment of the present invention. FIG. 1 diagrams how multiple game player terminal apparatuses 1A to 1E are connected to a server 3 through a network 2. FIG. 2 is a block diagram representing a specific configuration for the terminal apparatuses 1A to 1E which are personal computers or the like. FIG. 3 is a block diagram representing a specific configuration for the server 3.

As diagrammed in FIG. 2, each of the terminal apparatuses 1A to 1E comprises a master control unit 100 configured of a CPU or the like, a game program memory unit 101 wherein a game program is stored, configured of a recording medium such as a CD-ROM or dedicated ROM cassette or the like and a reader apparatus (not shown), etc., a control input device 102 configured of a dedicated controller or keyboard or the like, a monitor apparatus 103, such as a CRT or LCD or the like, a temporary memory unit 104 configured of a hard disk or RAM or the like, for temporary storing various kinds of data during a game, and a communication unit 105, configured of a modem or the like, for communicating via the network 2 with the server 3 or with any of the other terminal apparatuses 1A to 1E.

The server 3, on the other hand, as diagrammed in FIG. 3, comprises a master control unit 300, configured of a CPU or the like, for effecting the master control of the server 3, a game program memory unit 301, configured of an EEPROM, hard disk, or other nonvolatile writable memory, for storing a game program or the like, a latest data entry unit 302, configured of a keyboard or the like, for updating the program or data stored in the game program memory unit 301 or the like to the latest program or data, a virtual time timer 303 for arithmetically calculating the virtual time in the game that elapses faster than real time, a communication unit 304, configured of a modem or the like, for communicating with the terminal apparatuses 1A to 1E via the network 2, a message board unit 305, capable of being accessed at will by the game players, for writing any desired messages into or requesting a game competition, etc., a character data memory unit 306, configured of a hard disk unit or the like, for storing data relating to original characters trained independently by game players, a character data modification unit 307 for ranking the original characters according to the capabilities of the original characters trained independently by the game players, or causing the original characters to age according to the passage of virtual time, or the like, and a search unit 308 for searching the message board unit 305 or the character data memory unit 306, etc., when the server 3 has been accessed from the terminal apparatuses 1A to 1E, and reading out data relating to the original characters of the game players, etc.

Figure 4:
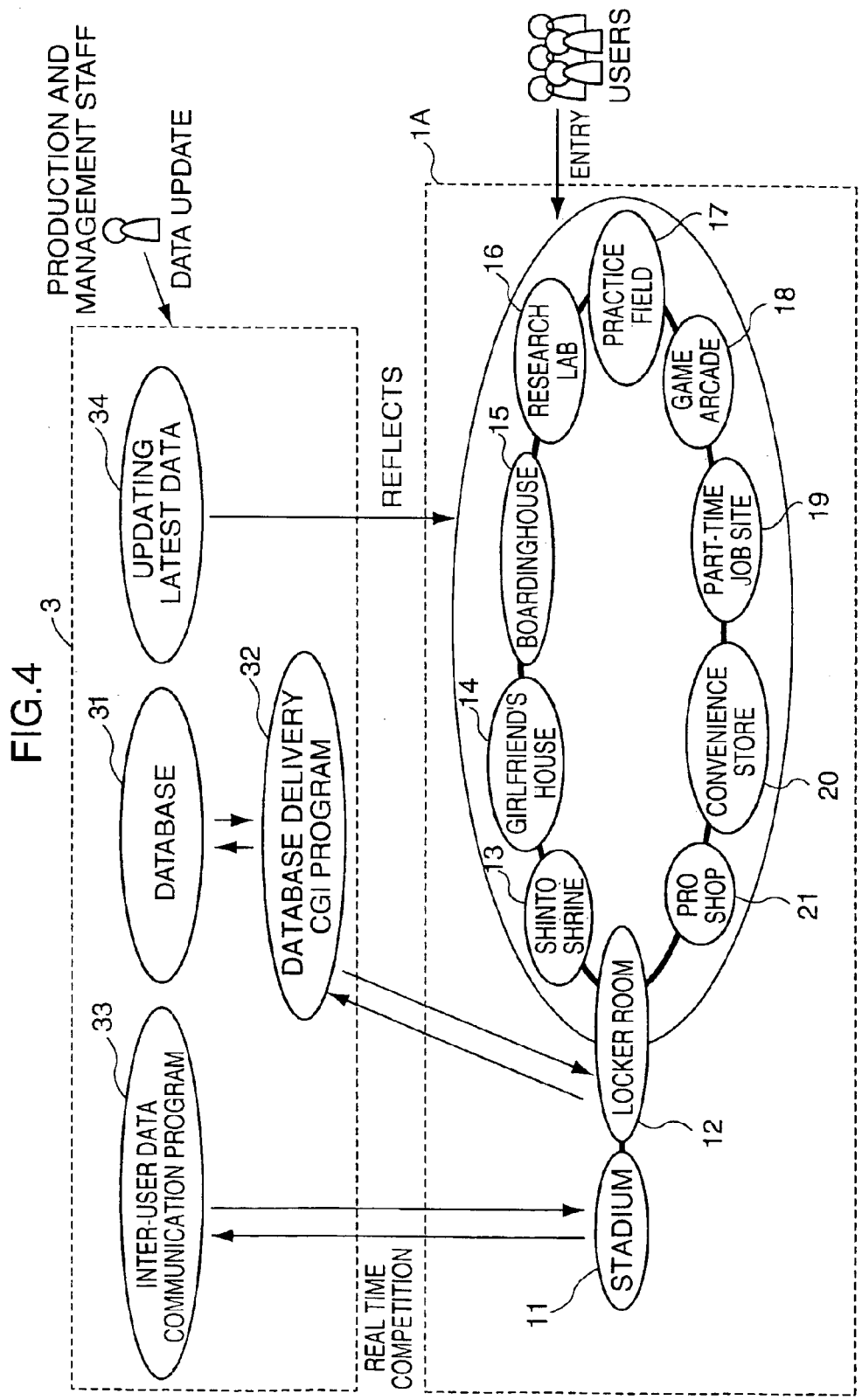
FIG. 4 is a diagram representing a virtual world when executing a baseball game in a server and one terminal apparatus connected to the server through a network, in the embodiment noted above.

FIG. 4 represents a virtual world realized when the baseball game is implemented in the server 3 and in one terminal apparatus (1A, for example) connected to the server 3 via the network 2.

The server 3 stores a database 31 for storing data relating to the original characters trained independently by the game players that control the terminal apparatuses 1A to 1E connected via the network 2, a database delivery CGI program 32 for performing deliveries of data between the terminal apparatuses 1A to 1E, an inter-user data communication program 33 for conducting data communication between the terminal apparatuses 1A to 1E of two or more game players directly competing in a game via the network, and updating latest data 34 for providing the latest data to the game program being executed by the terminal apparatuses 1A to 1E.

The terminal apparatuses 1A to 1E are dedicated game apparatuses or personal computers or the like, for example, which execute a game program by installing a game program stored in a memory medium 110 such as a CD-ROM or ROM cassette or the like into an internal hard disk or RAM or the like therein. The game players, using the control input devices 102 connected to the terminal apparatuses 1A to 1E, select menu items displayed on the screen of the monitor apparatus 103, and input movements for the game characters displayed on the screen, etc. The configuration may also be made so that the game program is stored at the server 3 side, and downloaded to the terminal apparatuses 1A to 1E via the network 2.

By executing the game program, a virtual world is configured in the terminal apparatuses 1A to 1E that includes a stadium 11 for playing the baseball game with another game player, a locker room 12 that is a place where agreements are made to play a game or information is exchanged with another game player, a Shinto shrine 13 that is a place where the game players train original characters, a girlfriend's house 14, boardinghouses 15, research lab 16, practice field 17, game arcade 18, part-time job site 19, convenience store 20, and pro shop 21, etc. In the description which follows, "Pawapuro-kun" is a name given to an original character trained independently by some game player.

Figure 5:
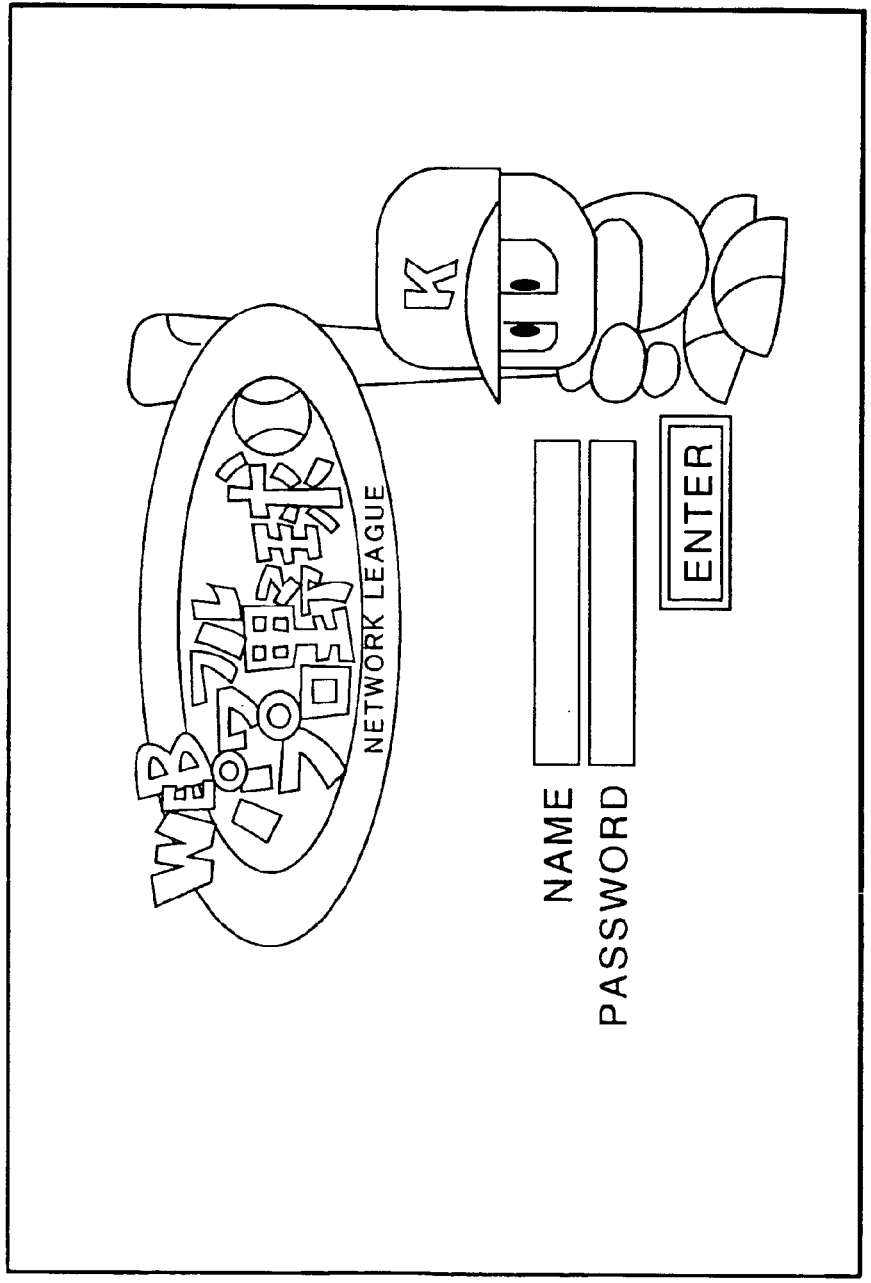
FIG. 5 is a diagram representing a password input screen displayed on the screen of a monitor apparatus, in the embodiment noted above.

First, when the game program is started up in the terminal apparatus of the game player, a password input screen such as that diagrammed in FIG. 5 is displayed on the screen of the monitor apparatus 103. In this screen, the name and password of the game player are entered, and, when the "Enter" button is clicked on, this terminal apparatus (1A, for example) and the server 3 are connected via the network 2.

Figure 6:
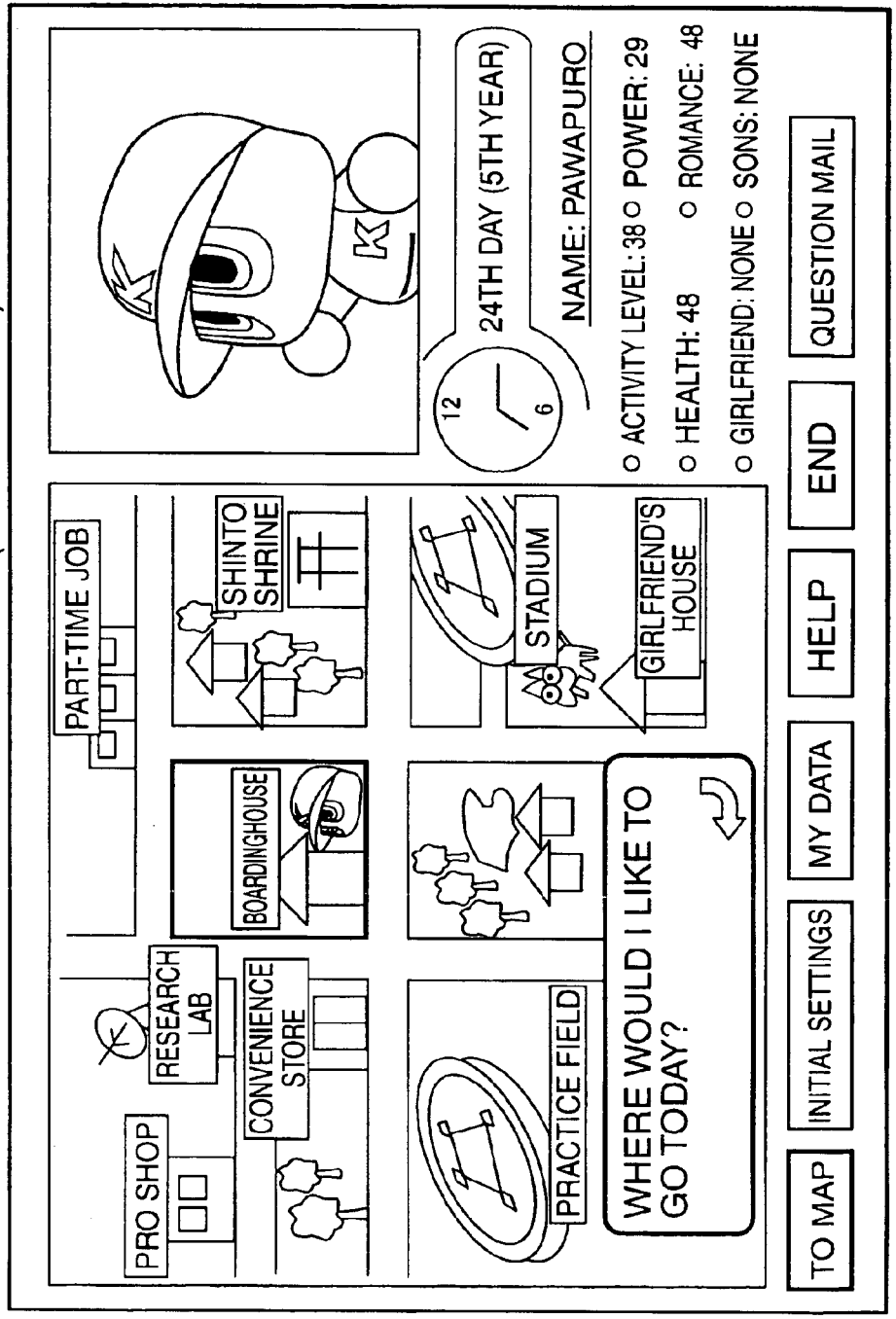
FIG. 6 is a diagram representing a boardinghouses screen for Pawapuro-kun displayed on the screen of a monitor apparatus, in the embodiment noted above.

When this terminal apparatus 1A and the server 3 are connected, the boardinghouses screen for Pawapuro-kun, such as diagrammed in FIG. 6, is displayed. In this boardinghouses screen, various menu items such as "to map," "initial settings," "my data," "Help," "End," and "question mail" can be selected. In FIG. 6, however, a condition wherein the map screen has been selected is diagrammed. On the map screen are indicated the pro shop, research lab, part-time job site, convenience store, Shinto shrine, practice field, stadium, and girlfriend's house, centered on the boardinghouses of Pawapuro-kun. When, on this screen, the pointer is moved over any desired position and clicked on that location, a subroutine program corresponding to the clicked location is executed. Status data including the current abilities of Pawapuro-kun stored in the database in the server 3 are displayed at the lower right of the screen. The status data displayed here may be modified at any time to reflect the amount of training done by Pawapuro-kun, his fatigue level, and his age, etc.

Figure 7:
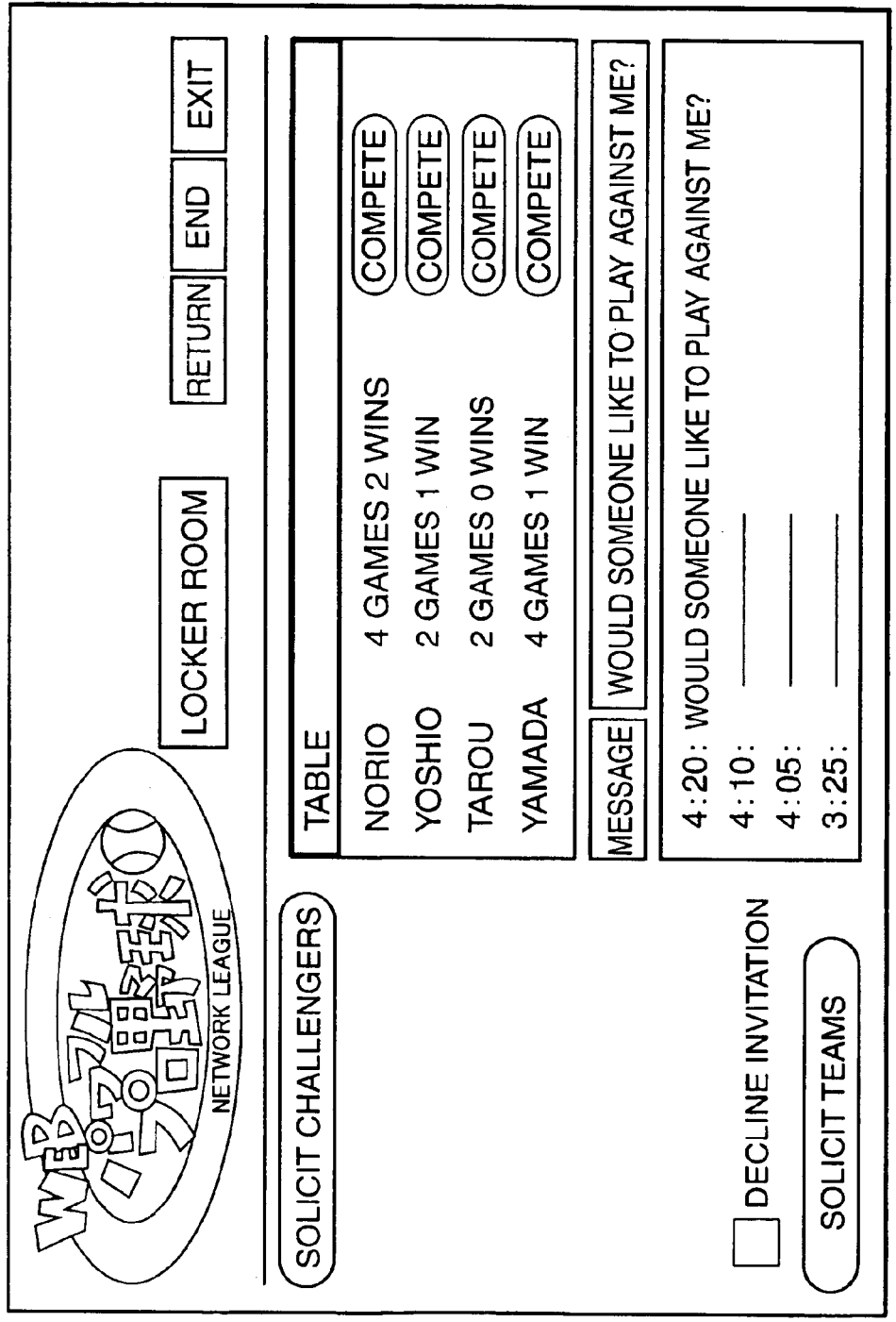
FIG. 7 is a diagram representing a locker room screen displayed on the screen of a monitor apparatus, in the embodiment noted above.
Figure 8:
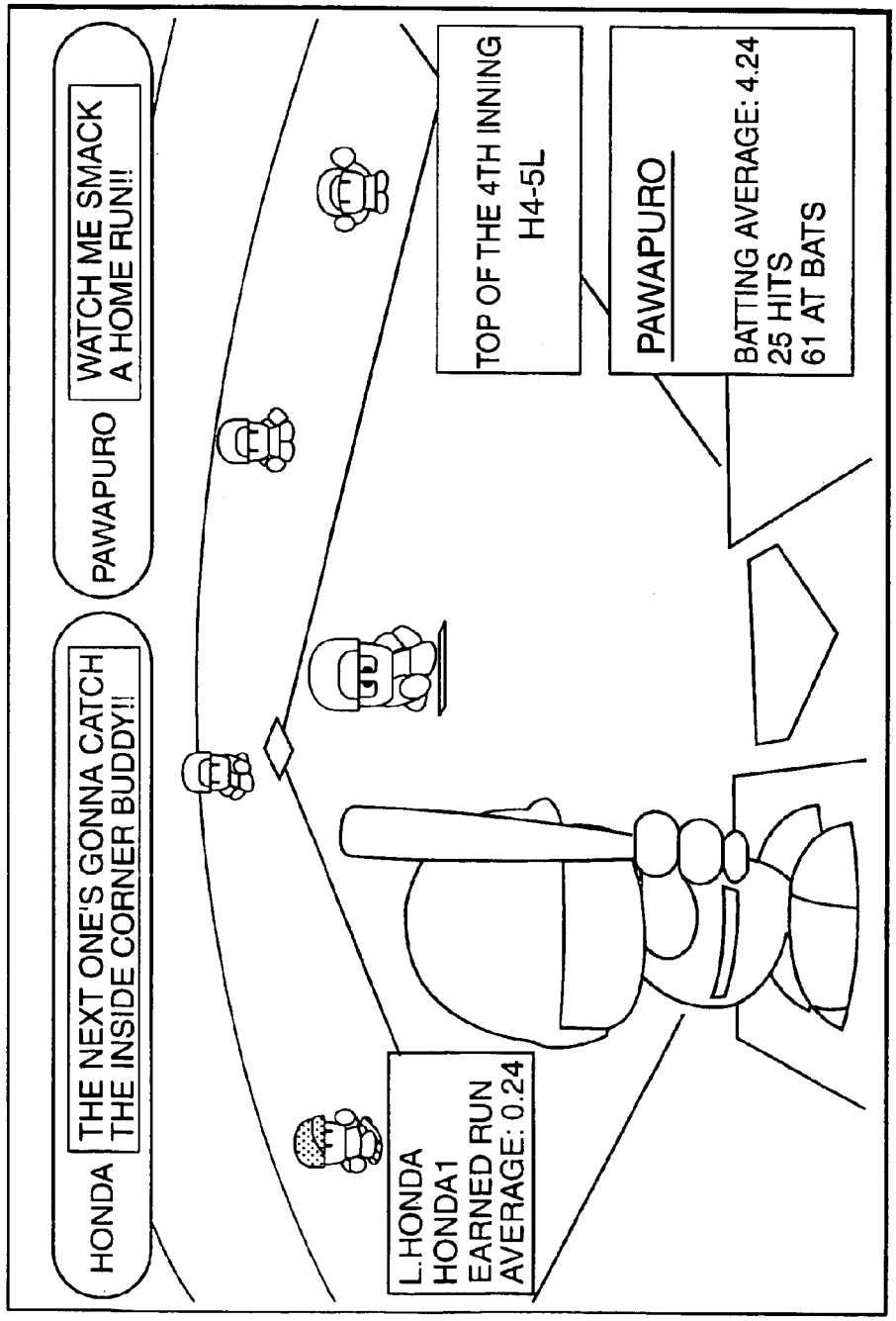
FIG. 8 represents a screen displayed on the screen of a monitor apparatus when playing the baseball game, in the embodiment noted above.

Next, when the stadium is clicked on, for example, a locker room screen like that diagrammed in FIG. 7 is displayed. In the locker room screen are listed the names of game players who wish to engage in competition and messages from other game players, etc. Here, if one of the game player's names is clicked on and selected, and the "compete" button at the right of that name is clicked on, the baseball game can be played with that selected game player. FIG. 8 represents a screen produced when the baseball game is being played against the selected game player. In this case, Pawapuro-kun is standing in the batter's box, wherefore a screen is displayed that represents the viewpoint of the catcher or plate umpire.

Figure 9:
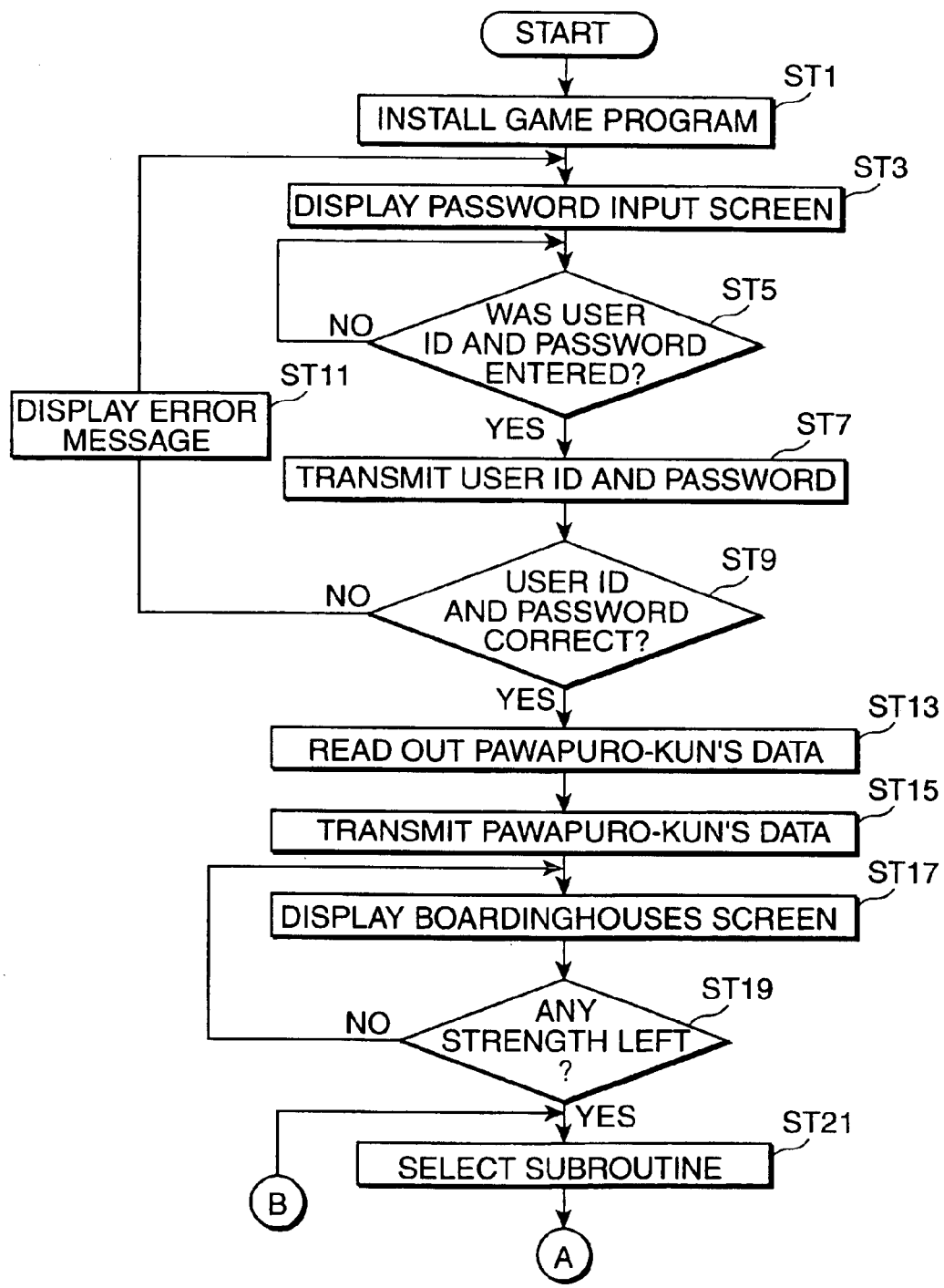
FIG. 9 is a diagram representing the main flow of the baseball game in the embodiment noted above.
Figure 10:
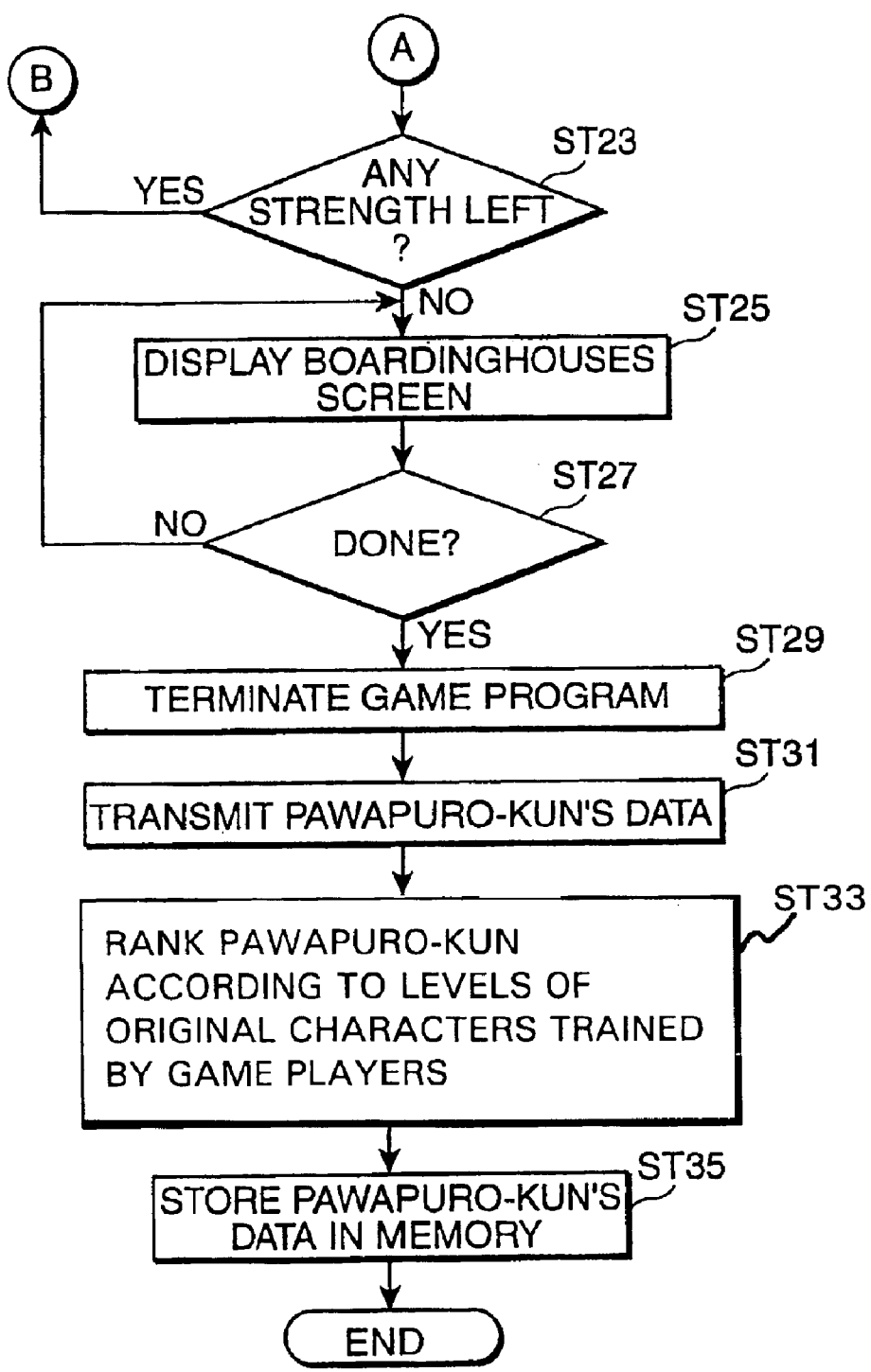
FIG. 10 is a diagram representing the continuation of the main flow diagrammed in FIG. 9.

Next, the baseball game in this embodiment is described with reference to the flowcharts given in FIG. 9 and 10. It is assumed that this game player (user) has already registered as a user with the server 3 and acquired a user ID.

First, the memory medium 110 is loaded into the terminal apparatus 1A, and the game program stored in the memory medium 110 is installed in the terminal apparatus 1A (step #1). When installation of the game program is complete, the terminal apparatus 1A begins executing the game program, and the password input screen diagrammed in FIG. 5 is displayed at the top of the screen on the monitor apparatus 103 (step #3). The terminal apparatus 1A waits for the user ID and password to be entered (step #5), and then transmits the entered user ID and password over the network 2 to the server 3 (step #7).

The server 3 compares the received user ID and password against previously registered user ID and password (step #9). If either the user ID or the password is wrong (NO in step #9), an error message is displayed at the top of the screen on the monitor apparatus 103 of the terminal apparatus 1A (step #11), and the password input screen display is returned to (step #3). If the transmitted user ID and password are correct (YES in step #9), on the other hand, the server 3 reads out data relating to Pawapuro-kun stored in the database 31 (step #13) and transmits those data to the terminal apparatus 1A (step #15).

Upon receipt of the Pawapuro-kun's data, the terminal apparatus 1A switches the screen of the monitor apparatus 103 to the boardinghouses screen indicated in FIG. 6 (step #17). A decision is also made as to whether or not Pawapuro-kun has any physical strength left (step #19), and when no such physical strength is left, step #17 is returned to and the terminal apparatus 1A waits until Pawapuro-kun's strength is restored. When Pawapuro-kun does have strength left (YES in step #19), on the other hand, one of the following subroutines is selected and executed, that is, (1) go over to the girlfriend's house for a visit, (2) pay a visit to worship at the Shinto shrine, (3) go shopping at the pro shop, (4) go shopping at the convenience store, (5) go make some money at the part-time job site, (6) go play at the game arcade, (7) go practice at the practice field, (8) go rebuild one's strength at the research lab, or (9) go to the stadium and play a game against another game player (step #21).

When the selected subroutine is finished, the terminal apparatus 1A again judges whether or not Pawapuro-kun has any physical strength left (step #23) and, when he does have physical strength left, step #21 is returned to and another subroutine is selected. If he has no strength left (NO in step #23), on the other hand, the terminal apparatus 1A switches the screen on the monitor apparatus 103 to the boardinghouses screen (step #25), and waits until either Pawapuro-kun's physical strength is restored or the game player selects game termination (step #27).

When the game player selects game termination (YES in step #27), the terminal apparatus 1A terminates the game program (step #29) and transmits the current data for Pawapuro-kun to the server 3 via the network 2 (step #31). The server 3 performs ranking on the Pawapuro-kun's data transmitted from the terminal apparatus 1A (step #33), stores the Pawapuro-kun's data in the database 31 (step #35), and terminates that baseball game.

Figure 11:
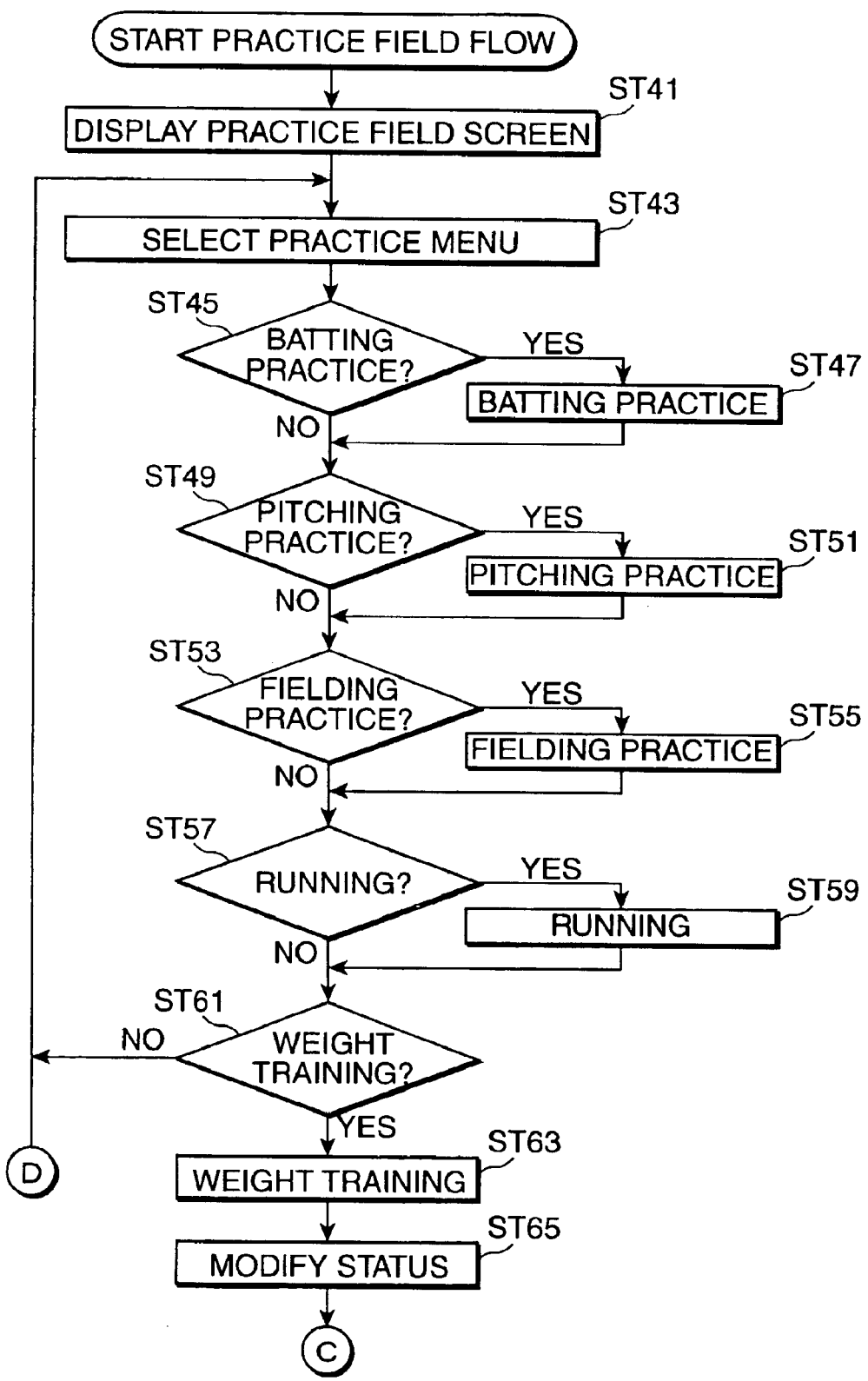
FIG. 11 is a diagram representing one example of a subroutine in step #21 in the main flow noted above.
Figure 12:
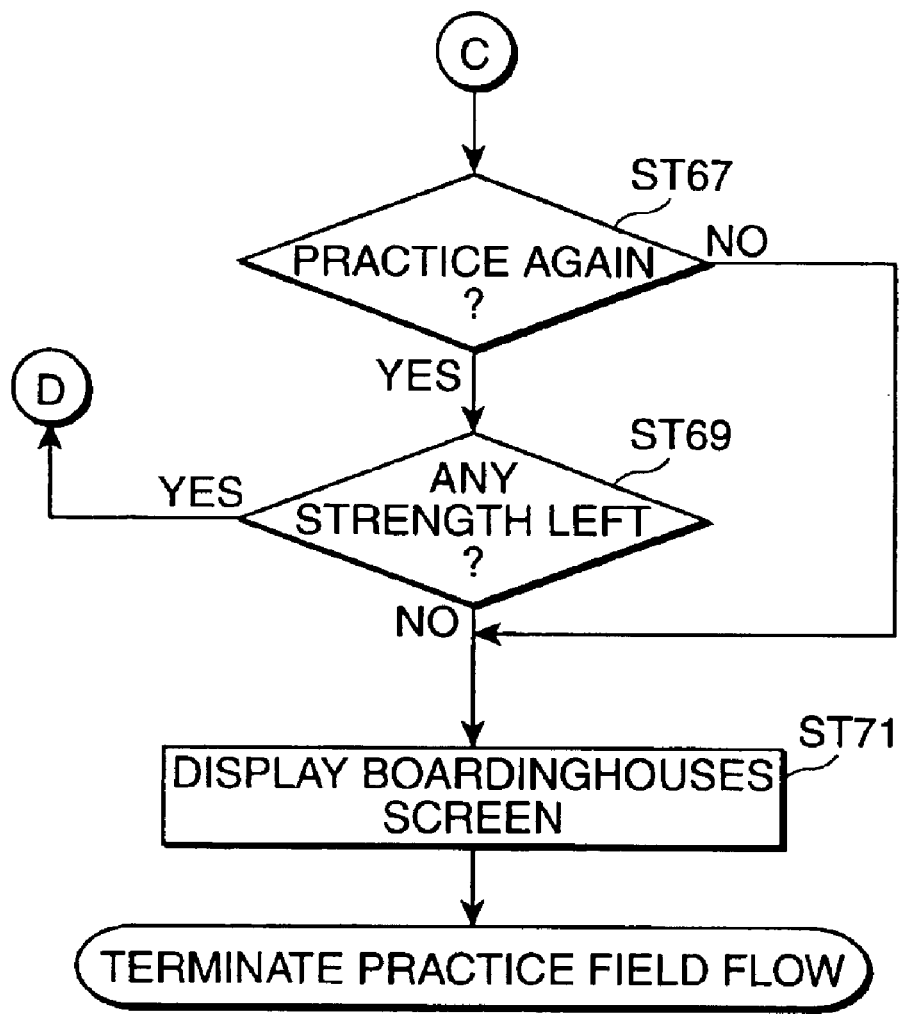
FIG. 12 is a diagram representing the continuation of the subroutine diagrammed in FIG. 11.

Next, as an example of a subroutine in step #21, the flow ensuing when (7) "go practice at the practice field" has been selected is described with reference to FIGS. 11 and 12.

First, when "go practice at the practice field" is selected, the terminal apparatus 1A switches the screen of the monitor apparatus 103 to the practice field screen (step #41). This is not shown particularly in the drawings, but the initial screen of the practice field screen is a practice menu selection screen, wherefrom it is possible to select, as examples, batting practice, pitching practice, fielding practice, running, and weight training (step #43). The terminal apparatus 1A decides, in order, whether batting practice has been selected (step #45), whether pitching practice has been selected (step #49), whether fielding practice has been selected (step #53), whether running has been selected (step #57), and whether weight training has been selected (#61). When batting practice, pitching practice, fielding practice, running, or weight training, respectively, has been selected, the terminal apparatus 1A reads out the game program corresponding to the selected menu item, and executes that game (steps #47, #51, #55, #59, and #63).

When a game is finished, instead of Pawapuro-kun's physical strength being expended, his abilities will either have improved or deteriorated depending on the results of the game of the menu item selected, wherefore the terminal apparatus 1A modifies the status (i.e. the status data displayed for Pawapuro-kun at the lower right of the screen diagrammed in FIG. 6) according to those categories (step #65). Then the terminal apparatus 1A determines whether the game player has selected "do another practice" or not (step #67) and, when "do another practice" has been selected, judges whether or not Pawapuro-kun has any physical strength left (step #69). If Pawapuro-kun does have physical strength left, step #43 is returned to and a practice menu is selected. If the game player has not selected "do another practice" (NO in step #67) and Pawapuro-kun has no strength left (NO in step #69), the terminal apparatus 1A changes the screen on the monitor apparatus 103 to the boardinghouses screen (step #71) and terminates the practice field flow.

Figure 13:
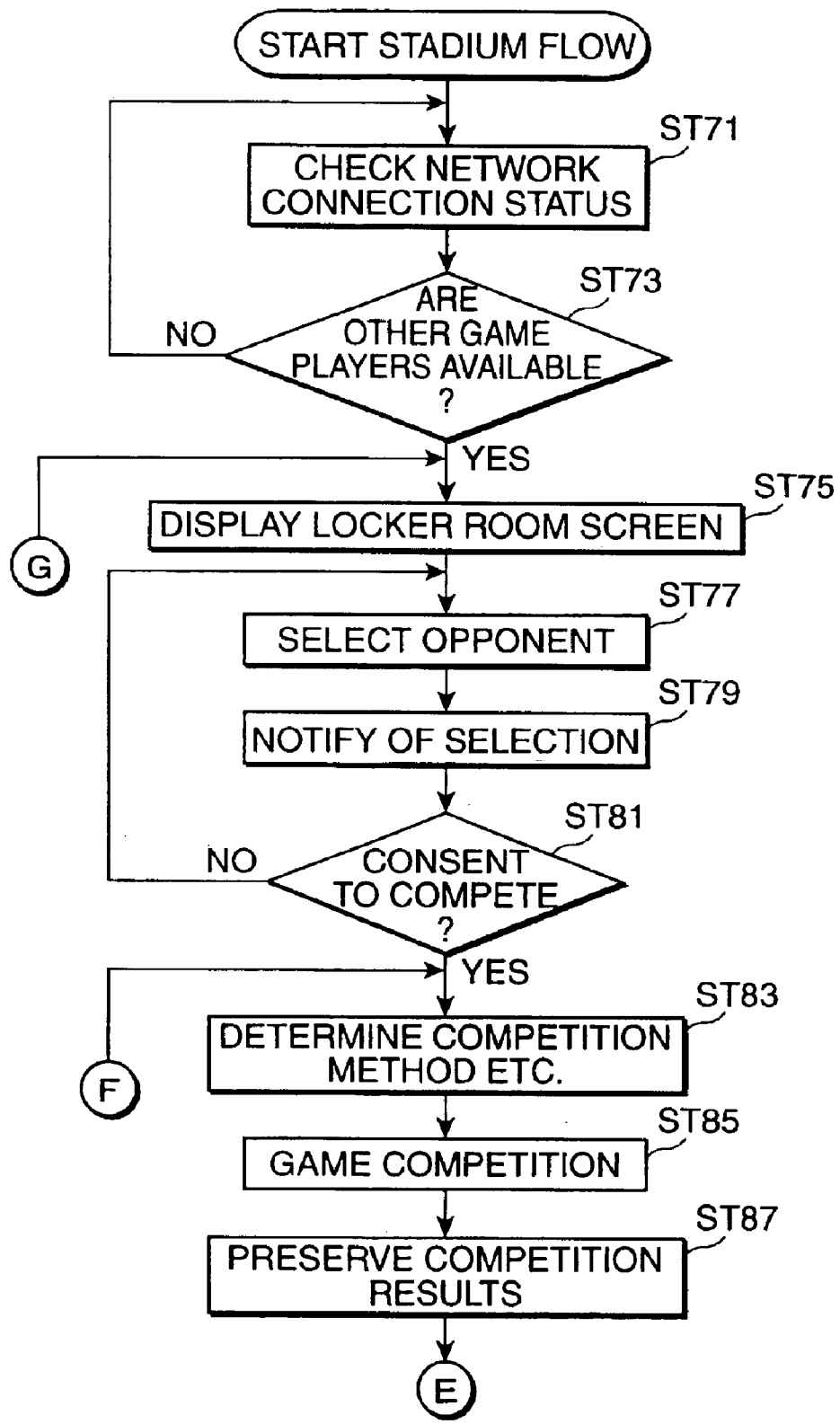
FIG. 13 is a diagram representing another example of a subroutine in step #21 in the main flow noted above.
Figure 14:
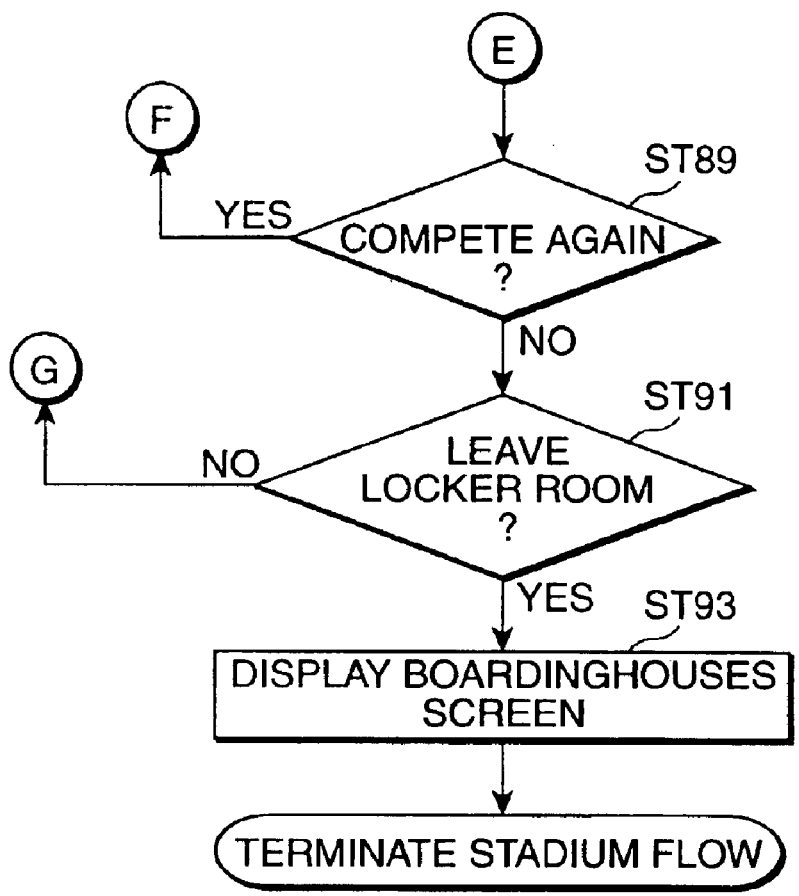
FIG. 14 is a diagram representing the continuation of the subroutine diagrammed in FIG. 13.

Next, the flow in the case of (9) "go to the stadium and play a game against another game player" in step #21 is described with reference to FIGS. 13 and 14. Here, moreover, the game player mainly described is referred to as player A, and the other game player as player B.

First, when "go to the stadium and play a game against another game players" is selected, the terminal apparatus 1A checks the status of the connection to the server 3 over the network 2 (step #71), and judges whether or not on the message board page of the server 3 another game player is registered as wishing to directly compete in the baseball game (step #73). When another game player is so registered, the terminal apparatus 1A switches the screen on the monitor apparatus 103 to the locker room screen diagramed in FIG. 7 (step #75) and a list of the game players who can compete is displayed. In this step #75, the following alternate steps shown in FIG. 15 may be employed. In step #75A, only a list of the game players having original characters that have attained a certain rank or above based on ranks determined in step #33 of FIG. 10 are displayed. Alternatively, in step #75B, only a list of game players having original characters ranked within a prescribed range based on the ranks determined in step #33 of FIG. 10 are displayed. When, on this screen, the game player A selects any other game player B (step #77), the server 3 notifies that other game player B, via the network 2, that he or she has been selected (step #79). When that selected other game player B either agrees to compete or refuses to compete, a signal corresponding to that agreement or refusal, respectively, is transmitted to the server 3 via the network 2, wherefore either the server 3 or the terminal apparatus 1A can determine whether the selected game player B has consented to compete against game player A or not (step #81).

When the selected game player B has consented to compete (YES in step #81), decisions are made between the game player A and the selected game player B as to the method of competition, who will bat first, and the number of innings to play and so forth (step #83). As to the method of competition, a homerun derby game or strikeout competition game may be played, for example, with the original character "Pawapuro-kun A" trained independently by the game player A and the original character "Pawapuro-kun B" trained independently by the game player B alternating between pitching and batting. Alternatively, a baseball game may be played between a team called "Pawapurozu A" made up of nine or more original characters trained independently by game player A and a team called "Pawapurozu B" made up of nine or more original characters trained independently by game player B.

When the method of competition is decided, the terminal apparatus 1A of the game player A and the terminal apparatus (1B, for example) of the game player B execute a baseball game (including the homerun derby game and the strikeout competition game) stored in the memory medium 110 according to control signals from the server 3 (step #85). The data relating to the original characters trained independently by the game players A and B, respectively, will be stored in the database 31 of the server 3, wherefore those data are transmitted to the terminal apparatuses 1A and 1B of the game players A and B prior to the commencement of the game and used as character data in the game program. Furthermore, control signals input when the game players A and B manipulate the control input devices 102 are transmitted via the network 2 to the server 3, where they are processed by the inter-user data communication program 33 of the server 3 and transmitted to the terminal apparatus 1B or 1A of the corresponding opponent.

When, for example, the game player A manipulates the control input device 102 connected to the terminal apparatus 1A and designates a pitch selection, course, and pitch start for Pawapuro-kun A (the pitcher) on the screen, those signals are sent to the terminal apparatus 1B of the game player B via the network 2 and the server 3. At the terminal apparatus 1B of the game player B, Pawapuro-kun A displayed on the screen of the monitor apparatus 103 of the terminal apparatus 1B is made to perform the prescribed pitching action, using the received signals. Simultaneously, the terminal apparatus 1A of the game player A also causes the Pawapuro-kun A displayed on the screen of the monitor apparatus 103 of the terminal apparatus 1A to perform the prescribed pitching action.

The game player B, while watching the screen of the monitor apparatus 103, manipulates the control input device 102 connected to the terminal apparatus 1B and causes Pawapuro-kun B to perform a swinging action. Signals relating to the timing, swing speed, and bat position in the swing action manipulated by the game player B are sent to the terminal apparatus 1A of the game player A via the network 2 and the server 3. The terminal apparatus 1A of the game player A, using those received signals, causes the Pawapuro-kun B displayed on the screen of the monitor apparatus 103 of the terminal apparatus 1A to perform the prescribed swing action. Simultaneously, the terminal apparatus 1B of the game player B also causes the Pawapuro-kun B displayed on the screen of the monitor apparatus 103 of the terminal apparatus 1B to perform the prescribed swing action.

The terminal apparatuses 1A and 1B arithmetically compute the bat and ball impact conditions (including a swing and a miss) using signals relating to the pitching done by the game player A and the swinging done by the game player B, respectively, and displays the action of the ball based on those arithmetic computation results on the screens of the monitor apparatuses 103. Thus the game players A and B can directly compete in a baseball game using the same game program, via the network 2 and the server 3. Also, because signals are transmitted and received between the terminal apparatuses 1A and 1B via the network 2 and the server 3, a slight time delay will occur from the moment that the game player A manipulates the control input device 102 until the Pawapuro-kun A begins the pitching action on the screen of the monitor apparatus 103 of the terminal apparatus 1B of the game player B, for example. Nevertheless, because a certain amount of time is required for a ball thrown by a pitcher to reach home plate, it is possible to prevent the game players A and B playing the game directly to sense any awkwardness by making the speed of signal transmission and reception faster than the speed wherewith the ball moves.

When the game competition ends in step #85, the server 3 preserves the results of that competition in the database 31 (step #87), and makes a query to both game player A and B as to whether or not they wish to compete again against the same opponent (step #89). If both game players agree (YES in step #89), step #83 is returned to and the method of competition is determined. If either game player A or B refuses to compete again (NO in step #89), on the other hand, either the server 3 or the terminal apparatuses 1A and 1B ask whether or not the game players wish to leave the locker room and return to the boardinghouses screen (step #91). Should the game player A wish to compete against some game player other than the game player B (NO in step #91), the terminal apparatus 1A returns to step #75 and displays the initial screen for the locker room. When the game player A is not to compete against another game player (YES in step #91), on the other hand, the terminal apparatus 1A switches the screen of the monitor apparatus 103 to the boardinghouses screen (step #93) and terminates the stadium flow.

Brief descriptions are given next for the subroutines in step #21, namely (1) "go over to the girlfriend's house for a visit," (2) "pay a visit to worship at the Shinto shrine," (3) "go shopping at the pro shop," (4) "go shopping at the convenience store, (5) "go make some money at the part-time job site," (6) "go play at the game arcade," and (8) "go rebuild one's strength at the research lab."

In this game system, furthermore, irrespective of whether or not a game player plays a game, virtual time elapses at a speed that is approximately ten times faster than that of actual time (1 year being 35 days), for example), and the transitions between day and night occur accordingly. Settings are also made so that Pawapuro-kun will age according to the passage of virtual time, so that Pawapuro-kun will automatically reach a certain age upon the passage of a certain time after the game player has started a game, and thereupon be forced to retire from active professional baseball play.

First, with (1) "go over to the girlfriend's house for a visit," Pawapuro-kun's enthusiasm and physical strength will change, either increasing or consuming depending on whether the girlfriend is in a good mood or bad. By having the girlfriend cook for him, Pawapuro-kun can raise his own enthusiasm and physical strength. If he gives her a present to put her in a better mood, that means he has to spend money. And if he goes out on a date with her, he will expend both money and physical strength. By putting her in a better mood, the "romantic index" will rise, and, depending on the "romantic index," a mode leading to marriage and having children can be advanced to. Also, a child born to them can be raised as "Pawapuro-kun Junior" and grow up into a professional baseball player. Pawapuro-kun can acquire the girlfriend by getting to know her at his part-time job or through his activities as a professional baseball player, etc. This routine cannot be advanced to so long as Pawapuro-kun has no girlfriend. Furthermore, the "romantic index" will decline when he puts her in a bad mood, and if the romantic index becomes 0, she will break up with him.

With (2) "pay a visit to worship at the Shinto shrine," by praying to the gods at the shrine, Pawapuro-kun will be able to perform well in a game, or reduce the severity of an injury.

(3) With "go shopping at the pro shop," a top-secret item that is sold at the pro shop can be purchased with money earned by Pawapuro-kun at the part-time job described further below. Also, Pawapuro-kun can perform well in a game by using that top-secret item. By accessing the updating latest data 34 in the server 3, the top-secret item can be renewed. When it is night in the virtual time described earlier, the pro shop will sometimes be closed.

In (4) "go shopping at the convenience store," a drink that will restore Pawapuro-kun's physical strength is sold at the convenience store. By accessing the updating latest data 34 in the server 3, new products can be marketed or the prices of products can be changed (marking the prices up or down). The convenience store is open 24 hours a day in the virtual time.

With (5) "go make some money at the part-time job site," Pawapuro-kun can select any of a number of jobs, differing in type depending on whether daytime or nighttime jobs, such as a sushi bar, karaoke joint, or host club, etc., and can earn part-time money according to the results of the selected game. The degree to which Pawapuro-kun will expend his physical strength and earn part-time money will also depend on the type of job performed.

In (6) "go play at the game arcade," games are established that have nothing to do with baseball. By playing these games, Pawapuro-kun can both spend money and restore his enthusiasm.

In (8) "go rebuild one's strength at the research lab," a mysterious doctor performs a suspicious surgical operation to reconstruct Pawapuro-kun into a baseball cyborg, but the abilities of this cyborg will depend on the reconstruction fee charged. After submitting to this baseball cyborg reconstruction, moreover, Pawapuro-kun will age faster and the time he can play actively will be shortened.

In the embodiment described in the foregoing, furthermore, the configuration is made such that the game program is stored in a CD-ROM or other memory medium, and started up from the terminal apparatuses 1A to 1E of the game players. That poses no limitation, however, and the configuration may be made such that the game program is downloaded from the server 3 over the network 2. In that case, the game players can enjoy the latest version of the game.

In the embodiment described in the foregoing, moreover, the configuration is made such that the passage of time is managed on the server, and so that the ages of the original characters increase even when the game players are not participating in the game. This need not be limited to age, however, and the configuration may be made so that there are changes in various data relating to the original characters, such as deterioration in eyesight or injuries healing, etc. Nor must this be limited to data relating to the original characters, but the configuration may be made so that all kinds of data relating to the game change, such as the baseball equipment deteriorating, plants growing, or food products losing their freshness, etc. The configuration may even be made so that the muscle tone of an original character declines when a game player does not access the server for a long time or does not use that original character.

Also, in the embodiment described in the foregoing, the description is for the example of a baseball game, but the present invention is not limited thereto or thereby, and can be applied to a soccer game or other games in general wherein two or more game players can play against each other.

In the embodiment described in the foregoing, furthermore, the description is given for the case where one game player trains original characters for one team, but one team may be made up of a plurality of original characters trained by a plurality of game players. The configuration might be, for example, one wherewith three or more game players can participate in one game, with the pitcher being Pawapuro-kun A trained by game player A, the catcher being Pawapuro-kun B trained by game player B, the first baseman being Pawapuro-kun C trained by game player C, and so on. The configuration may also be made so that the game players make trades between themselves with the original characters that they have trained.

In the embodiment described in the foregoing, moreover, the description is given for the case where the same images are displayed on the screens of the monitor apparatuses 103 of the terminal apparatuses 1A to 1E of the game players, but that poses no limitation, and the configuration may be made so that different images are displayed on the screens of the monitor apparatuses 103 of the terminal apparatuses of the game players. The configuration may be made so that, for example, when the Pawapuro-kun A trained by game player A is the pitcher and the Pawapuro-kun B trained by game player B is the batter, images are displayed on the screen of the monitor apparatus 103 of the terminal apparatus 1A as seen from the perspective of the pitcher or, alternatively, as seen from the back screen, and images are displayed on the monitor apparatus 103 of the terminal apparatus 1B of the game player B as seen from the perspective of the batter or, alternatively, as seen from behind the back net. The configuration may also be made so that images are displayed on the monitor apparatus 103 of the terminal apparatus (1C, for example) of a game player C as seen from the perspective of the first baseman or, alternatively, as seen from the outfield.

Moreover, the present invention is also applicable the following modes.

The game procedure control method according to an aspect of the present invention is a game procedure control method wherewith at least two game players can engage in direct competition, using at least two terminal apparatuses connected to a server through a network, comprising the steps of: storing data relating to an original character trained independently by each game player in a prescribed memory area in the server; reading out the data relating to the original character of each game player stored in the memory area as character data to be used when a game program is executed; transmitting control data input by each game player for causing his or her own original character to move on the monitor screen of the terminal apparatus to the terminal apparatus of a game player that is a competing opponent via the server; and causing the original character of the opponent to move, in correspondence with the control data, on the monitor screen of each terminal apparatus, using the control data transmitted back from the server.

According to this composition, it becomes possible to cause original characters trained by game players to compete directly against each other via a network.

In the method described above, the game program may be stored in the server, and downloaded to the terminal apparatuses of the game players and executed.

Alternatively, the game program may be recorded in a memory medium, and installed in the terminal apparatuses of the game players and executed.

Moreover, ranking may be performed according to the levels of the original characters trained independently by the game players, and competition with another game player made possible only when a certain rank or above has been attained. In this case, competition between game players having extremely different abilities can be avoided.

Furthermore, competition may be made possible only with a game player having an original character ranked within a prescribed range, according to the ranks of the original characters trained independently by the game players. In this case, game players at roughly the same level can be made to compete with each other. It is also possible then to form leagues according to game player abilities.

Furthermore, each game player may train a plurality of original characters, and teams made up of these pluralities of original players may be caused to compete with each other. In this case, it becomes possible to conduct games requiring pluralities of game characters, as a baseball game, for example.

Alternatively, a team may be made up of pluralities of original characters trained by pluralities of game players, and teams made up in the same way caused to compete. In this case, it becomes possible to have three or more game players participate.

Furthermore, a message board page capable of being accessed at will by the game players may be provided in the server, so that game players are able to at least record, in the message board page, either their wish to compete in a game or consent to compete. In this case, it becomes possible to provide more opportunities to compete against other game players.

Furthermore, the same screen may be displayed on the monitor screens of the terminal apparatuses of the game players. In this case, it becomes possible to raise the arithmetic processing speed in cases of games involving comparatively few screen changes such as roll playing games where two game characters fight each other directly.

Alternatively, game images from a camera perspective established in correspondence with the original character of each game player may be displayed on the monitor screen of the terminal apparatus of each game player. In this case, in a baseball game or the like, for example, images seen from the perspective of the pitcher can be displayed on the monitor screen of the game player controlling the game character doing the pitching, and images seen from the perspective of the batter can be displayed on the monitor screen of the game player controlling the game character doing the batting, making it possible to experience greater game realism.

Furthermore, the passage of time on the server may be monitored, and the data relating to the ages of the original characters on the server may change irrespective of whether or not the game players participate in games. In this case, character control can be effected so that, for example, the physical strength and athletic abilities of an athlete character increase as his or her age increases when he or she is young, then peak at a certain age, and thereafter gradually decline, making it possible to experience greater game realism.

Furthermore, in the data on the server, data relating to the ages of the original characters may change.

The game system according to another aspect of the present invention comprises: a server wherein are stored data relating to original characters trained independently by game players, being character data used in order to execute a game program wherewith direct competition is possible between at least two game players; and a plurality of terminal apparatuses, each of which is capable of being connected to the server through a network, comprises a control unit manipulated by the game player, and is capable both of storing data relating to the original character in the server and of reading out data relating to the original character when the game program is executed.

According to this composition, two or more game players who do not know each other can directly compete in a game via a network. It is also possible to hold tournaments participated in by many game players.

In the system described above, the game program may be stored in the server, and downloaded to the terminal apparatuses of the game players and executed.

Alternatively, the game program may be recorded in a memory medium, and installed in the terminal apparatuses of the game players and executed.

The server according to still another aspect of the present invention is one wherein: access is possible from terminal apparatuses operated by game players through a network; and data relating to original characters trained independently by the game players, which are character data to be used for executing a game program wherewith direct competition is possible between at least two game players, are stored.

According to this composition, it becomes possible for game players to access the server from a terminal apparatus of a different type from their own personal computer or game apparatus, and engage in direct game competition.

Moreover, the server may also store the game program that is downloaded and executed in the terminal apparatuses of the game players.

This application is based on Japanese application serial no. 2000-233670 filed in Japan on Aug. 1, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A game procedure control method permitting at least two game players to engage in competition, using at least two terminal apparatuses having monitors connected to a server through a network, comprising the steps of:
    storing data relating to original characters, each trained independently by each of said at least two game players, in a prescribed memory area in said server, wherein said data includes physical characteristic data based on age;
    reading out said data relating to the original characters of each of said at least two game players from said memory area as character data to be used when a game program is executed;
    transmitting control data input by at least first and second game players of said at least two game players, for causing corresponding ones of said original characters to move on the monitor screen of each of the terminal apparatuses, to a terminal apparatus of a competing game player of said first and second game players via said server;
    moving said corresponding ones of said original characters on each of the monitors of said first and second same players in accordance with said control data input by corresponding ones of said first and second game players; and
    monitoring passage of virtual time on said server, causing said original characters to age according to said passage of virtual time, and changing said physical characteristic data relating to ages of said original characters based on said passage of virtual time irrespective of whether or not the game players participate in games during a period of said monitoring.

2. The game procedure control method according to claim 1, wherein said game program is stored in said server, and downloaded to terminal apparatuses of said game players and executed.

3. The game procedure control method according to claim 1, wherein said game program is recorded in a memory medium, and installed in terminal apparatuses of said game players and executed.

4. The game procedure control method according to claim 1, wherein said original characters trained independently by said game players are ranked according to levels based on said physical characteristic data thereof, and competition between said first and second game players is made possible only when said original characters of said first and second game players have attained a certain rank or above.

5. The game procedure control method according to claim 1, wherein said original characters trained independently by said game players are ranked according to levels based on said physical characteristic data thereof, and wherein competition between said first and second game players is made possible only when said original characters of said first and second game players are ranked within a prescribed range of one another.

6. The game procedure control method according to claim 1, wherein each of said first and second game players trains a plurality of original characters, and teams made up of these pluralities of original characters compete with each other.

7. The game procedure control method according to claim 1, wherein a team is made up of a plurality of original characters trained by a corresponding plurality of said at least two game players, and said team competes with another team.

8. The same procedure control method according to claim 1, wherein said server is provided with a message board page capable of being accessed at will by said at least two game players, so that said at least two game players are able to at least record, in said message board page, either a request to compete in a game or consent to compete.

9. The game procedure control method according to claim 1, wherein the same screen is displayed on monitor screens of said terminal apparatuses of said first and second game players.

10. The game procedure control method according to claim 1, wherein game images from a camera perspective established in correspondence with the original character of each of said first and second game players are displayed on the monitor screen of the terminal apparatus of each of said first and second game players.

11. The game procedure control method according to claim 1, wherein the speed of passage of virtual time is set faster than that of actual time.

12. The game procedure control method according to claim 11, wherein said passage of virtual time is set such that a transition between day and night occurs in accordance with said speed of the passage of the virtual time.

13. A game system comprising:
    a server for storing data relating to original characters trained independently by game players, said data including physical characteristic data used for a game program which enables competition between at least first and second game players of said game players; and
    a plurality of terminal apparatuses, each of which is capable of being connected to said server through a network, comprises a control unit manipulated by said game players, and is capable both of storing data relating to said original character of a corresponding one of said game players in said server, said data including physical characteristic data based on age, and of reading out said data relating to said original character of said corresponding one of said game players when said game program is executed; and
    said serving including a monitoring device for monitoring passage of virtual time, causing said original characters to age according to said passage of virtual time, and changing said physical characteristic data relating to ages of said original characters based on said passage of virtual time irrespective of whether or not the game players participate in games during a period of said monitoring.

14. The game system according to claim 13, wherein said game program is stored in said server, and downloaded to the terminal apparatuses of said game players and executed.

15. The game system according to claim 13, wherein said game program is recorded in a memory medium, and installed in the terminal apparatuses of said game players to be executed thereby.

16. The game procedure control method according to claim 1, wherein said physical characteristic data includes a physical strength or an athletic ability of the original characters.

17. The game procedure control method according to claim 16, wherein said physical strength and the athletic ability increase as ages of the original characters increase when the original characters are younger than a peak age and the physical strength and the athletic ability decrease as the ages of the original characters increase past said peak age.

18. The game system according to claim 13, wherein said physical characteristic data includes a physical strength or an athletic ability of the original characters.

19. The game system according to claim 18, wherein said monitoring device increases said physical strength and the athletic ability as ages of the original characters increase when the original characters are younger than a peak age, and said monitoring device decreases the physical strength and the athletic ability as the ages of the original characters increase past said peak age.

* * * * *